United States Patent [19]

Friedmann

[11] Patent Number: 5,139,124
[45] Date of Patent: * Aug. 18, 1992

[54] APPARATUS FOR COMPENSATING FOR FLUCTUATIONS OF TORQUE BETWEEN THE ENGINE AND THE TRANSMISSION OF A MOTOR VEHICLE

[75] Inventor: Oswald Friedmann, Lichtenau, Fed. Rep. of Germany

[73] Assignee: Luk Lamellen Und Kupplungsbau GmbH, Bühl, Fed. Rep. of Germany

[*] Notice: The portion of the term of this patent subsequent to Jul. 27, 2004 has been disclaimed.

[21] Appl. No.: 904,616

[22] Filed: Sep. 5, 1986

[30] Foreign Application Priority Data

Sep. 7, 1985 [DE] Fed. Rep. of Germany ....... 3532005
Nov. 5, 1985 [DE] Fed. Rep. of Germany ....... 3539194
Nov. 7, 1985 [DE] Fed. Rep. of Germany ....... 3539406

[51] Int. Cl.$^5$ .................... F16D 3/10; F16D 3/14; F16D 21/08
[52] U.S. Cl. .................... 192/48.3; 74/574; 192/103 A; 192/106.2; 464/46; 464/68
[58] Field of Search ........... 192/48.3, 56 R, 70.17, 192/103 A, 105 C, 106.2, 106.1; 464/46, 66, 68; 74/574

[56] References Cited

U.S. PATENT DOCUMENTS

| | | | |
|---|---|---|---|
| 1,560,267 | 11/1925 | Lippincott | 192/105 C |
| 3,136,178 | 6/1964 | O'Connor | 464/46 X |
| 4,274,524 | 6/1981 | Nakane | 192/48.3 |
| 4,681,199 | 7/1987 | Maucher et al. | 192/70.23 |

FOREIGN PATENT DOCUMENTS

| | | | |
|---|---|---|---|
| 258542 | 5/1928 | Italy | 192/105 C |
| 191909 | 9/1937 | Switzerland | 464/66 |
| 2103760 | 2/1983 | United Kingdom | 192/106.2 |
| 2153970 | 8/1985 | United Kingdom | 192/106.2 |

*Primary Examiner*—Rodney H. Bonck
*Attorney, Agent, or Firm*—Peter K. Kontler

[57] ABSTRACT

Apparatus for transmitting torque from the engine-driven crankshaft to the input shaft of the change-speed transmission in a motor vehicle has two coaxial flywheels which are rotatable relative to each other against the opposition of three series-connected dampers including a pair of annular slip clutches and an elastic damper between the slip clutches. One of the slip clutches opposes all angular movements of the flywheels relative to each other and its output element transmits torque from the flywheel which is driven by the crankshaft to the input element of the elastic damper. The output element of the elastic damper is the input element of the other slip clutch which is mounted on the other flywheel and opposes rotational movements of the flywheels relative to each other within a preselected angle.

54 Claims, 5 Drawing Sheets

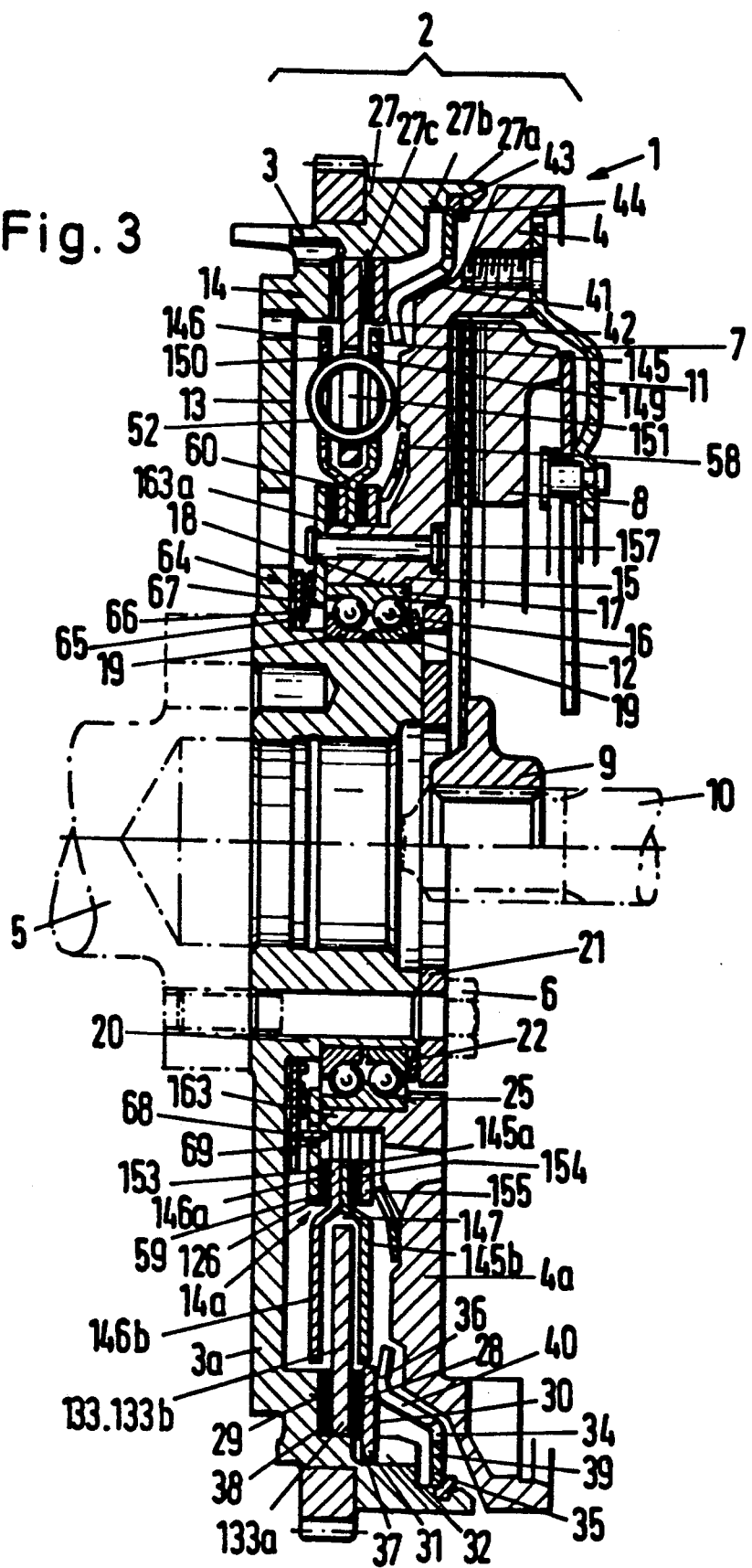

APPARATUS FOR COMPENSATING FOR FLUCTUATIONS OF TORQUE BETWEEN THE ENGINE AND THE TRANSMISSION OF A MOTOR VEHICLE

CROSS-REFERENCE TO RELATED CASES

The apparatus of the present invention constitutes an improvement over and a further development of apparatus which are disclosed in commonly owned copending U.S. patent application Ser. Nos. 848,729 and 848,730 filed Apr. 4, 1986 by Paul Maucher and Oswald Friedmann, and now U.S. Pat. Nos. 4,751,992 and 4,681,199, respectively.

BACKGROUND OF THE INVENTION

The present invention relates to improvements in apparatus which serve to compensate for fluctuations of torque between the engine and the transmission of a motor vehicle. More particularly, the invention relates to improvements in apparatus which can be utilized between the crankshaft of an internal combustion engine and the input shaft of a change-speed transmission in an automotive vehicle to reduce shocks which develop when the magnitude of torque which is transmitted by the crankshaft fluctuates within a wide or a narrow range. Still more particularly, the invention relates to improvements in apparatus wherein several dampers serve to transmit torque between a plurality of coaxial flywheels including a first flywheel which is driven by the crankshaft of the engine and a second flywheel which can drive the input shaft of the change-speed transmission and is rotatable relative to the first flywheel.

An apparatus of the just outlined type is disclosed, for example, in U.S. Pat. No. 4,274,524 to Nakane. The apparatus of Nakane comprises a slip clutch and an elastic damper which is in series with the slip clutch and comprises a set of energy storing elements in the form of coil springs. The elastic damper of the patented apparatus further comprises a friction generating device which is mounted in parallel with the coil springs. The slip torque of the clutch considerably exceeds the maximum nominal torque which is generated by the internal combustion engine so that the clutch ceases to transmit torque only when the magnitude of transmitted torque fluctuates within a rather wide range.

The patented apparatus can bring about a reduction of stresses upon the power train between the engine and the wheels of a motor vehicle so that it reduces the likelihood of generation of excessive noise and contributes, to a certain degree, to the comfort of the occupant or occupant of the vehicle. However, the patented apparatus also exhibits certain serious drawbacks, particularly because it cannot ensure a predictable compensation for fluctuations of torque within the entire RPM range of the internal combustion engine. One of the reasons for such failure of the patented apparatus to operate properly within the entire RPM range is that the slip clutch responds only to very pronounced fluctuations of torque above the nominal torque which is transmitted by the internal combustion engine. The slip clutch of the patented apparatus transmits a maximum torque also when the engine operates within the lower part of the RPM range so that the apparatus cannot compensate for relatively small fluctuations of torque which is transmitted by the engine. This affects the comfort of the occupant or occupants and contributes significantly to the generation of noise during the aforementioned stages of operation of the engine.

OBJECTS AND SUMMARY OF THE INVENTION

An object of the invention is to provide a novel and improved apparatus which can compensate for any and all expected fluctuations of torque between the engine and the transmission of a motor vehicle or the like.

Another object of the invention is to provide the apparatus with novel and improved damper means.

A further object of the invention is to provide an apparatus which can effectively and reliably counteract and compensate for any and all fluctuations of torque which is transmitted by the internal combustion engine of a motor vehicle to the input shaft of a change-speed transmission, irrespective of the selected RPM range of the crankshaft of the engine.

An additional object of the invention is to provide an apparatus whose versatility greatly exceeds that of heretofore known apparatus.

A further object of the invention is to provide a relatively simple, compact and inexpensive apparatus which can be installed in existing types of motor vehicles to compensate for fluctuations of torque between the crankshaft of the engine and the input shaft of the change-speed transmission.

Another object of the invention is to provide an apparatus wherein all component parts are properly balanced against running out of true.

Still another object of the invention is to provide a novel and improved method of compensating for fluctuations of torque between the crankshaft of an internal combustion engine and the input shaft of a change-speed transmission in a motor vehicle or the like.

A further object of the invention is to provide an apparatus which comprises a relatively small number of parts, wherein numerous parts can perform a plurality of different functions, and wherein all sensitive parts are readily accessible for inspection, repair and/or replacement.

One feature of the invention resides in the provision of an apparatus which compensates for and counteracts fluctuations of torque between the output member (such as a crankshaft) of an internal combustion engine and the input member (such as a shaft) of a change-speed transmission in a motor vehicle. The apparatus comprises a plurality of coaxial flywheels including a first flywheel which serves to receive torque from the output member of the engine and a second flywheel which serves to transmit torque to the input member of the transmission. The flywheels are rotatable relative to each other and the second flywheel can transmit torque to the input member of the transmission by way of a friction clutch. The improved apparatus further comprises a plurality of dampers which are disposed in series and operate to oppose rotation of the first and second flywheels relative to each other. The dampers include a first and a second slip clutch and an elastic damper. The first slip clutch is preferably constructed and assembled to oppose all angular movements of the first and second flywheels relative to each other and is preferably designed to transmit torque from the first flywheel to the input element of the elastic damper. The output element of the elastic damper preferably transmits torque to the input element of the second slip clutch which is preferably constructed and assembled to oppose certain angular movements of the first and second flywheels relative to each other and the output element of which transmits torque to the second flywheel. The arrangement is preferably such that the slip torque of the first slip clutch exceeds the slip torque of the second slip clutch.

The elastic damper is preferably disposed in a predetermined plane which extends at right angles to the common axis of the first and second flywheels, and at least one of the first and second slip clutches is preferably disposed in or at least close to such plane. The first slip clutch is preferably disposed at a first radial distance from the common axis of the first and second flywheels, the elastic damper is preferably disposed at a lesser second distance from such axis, and the second slip clutch is preferably nearest to the common axis of the first and second flywheels.

At least one of the slip clutches, preferably the first slip clutch, includes means for opposing rotation of the first and second flywheels relative to each other with a variable force. The input member is arranged to drive the first flywheel at a variable speed, and the means for opposing rotation of the first and second flywheels relative to each other with a variable force is preferably responsive to variations of speed of the first flywheel. This can be achieved by designing the first slip clutch in such a way that it transmits a torque whose magnitude increases with increasing speed of the first flywheel. The second slip clutch can be designed to oppose rotation of the first and second flywheels relative to each other with a substantially constant force. The torque which is transmitted by the first slip clutch need not match or even approximate the torque which is transmitted by the second slip clutch. It is presently preferred to design the slip clutches in such a way that the torque which is transmitted by the first slip clutch exceeds the torque which is transmitted by the second slip clutch. The first slip clutch is preferably designed in such a way that it opposes relative angular movements of the first and second flywheels with a certain minimal force exceeding zero force regardless of the rotational speed of the first and/or second flywheel.

Each slip clutch can include at least one energy storing element, particularly an energy storing element in the form of a diaphragm spring which can be installed in stressed condition. The diaphragm spring of the first slip clutch can be mounted and configurated in such a way that its bias varies in response to changes of magnitude of centrifugal force acting upon it, particularly in response to changes in rotational speed of the first flywheel (namely of the flywheel which is driven by the engine). Such diaphragm spring can include an axially stressed annular portion and at least one axially stressed second portion which is axially offset relative to the annular portion and the bias of which increases in response to increasing centrifugal force. Such slip clutch can further comprise an axially movable friction generating element (for example, in the form of a disc or ring forming part of the output element of the first slip clutch) which is biased by the second portion of the diaphragm spring.

At least one of the flywheels is preferably provided with an axial protuberance (for example, in the form of a cylindrical sleeve), and one of the slip clutches (preferably the second slip clutch) surrounds the protuberance of the one flywheel. The second slip clutch is preferably mounted directly on the second flywheel, and the apparatus preferably further comprises a friction clutch which is interposed between the second flywheel and the input member of the change-speed transmission.

In accordance with a presently preferred embodiment of the invention, the first slip clutch is operative to oppose all angular movements of the first and second flywheels relative to each other and includes an input element having a disc-shaped component, means for axially movably but non-rotatably coupling the disc-shaped component to the first flywheel, confronting first and second friction surfaces which are respectively provided on the first flywheel and on the disc-shaped component, and an output element which is disposed between and is in engagement with the friction surfaces. Such first slip clutch preferably further comprises a diaphragm spring which serves to bias the disc-shaped component axially toward the output element and to thereby bias the output element axially against the first friction surface. The diaphragm spring is preferably provided with an annular portion which reacts against the first flywheel and at least one prong which bears against the disc-shaped component. The prong preferably extends from the annular portion toward the common axis of the first and second flywheels.

The friction surfaces of the input element of the first slip clutch rotate with the first flywheel, and the elastic damper has an input element which receives torque from the output element of the first slip clutch. The elastic damper further comprises an output element which serves to transmit torque to the second slip clutch, and at least one energy storing resilient element (preferably in the form of one or more coil springs) between the input and output elements of the elastic damper. The input element of the elastic damper can be rigid or integral with the output element of the first slip clutch. The input element of the second slip clutch is or can be rigid or integral with the output element of the elastic damper, and the output element of the second slip clutch is preferably arranged to rotate with the second flywheel. In such apparatus, the output element of the first slip clutch can comprise two friction linings which engage the friction surfaces. The output element of the first slip clutch can comprise two coaxial discs having radially outer portions which are disposed between the friction surfaces of the input element of the first slip clutch and axially spaced-apart radially inner portions which constitute the input element of the elastic damper and flank the output element of the elastic damper. In such apparatus, the output element of the elastic damper and the radially inner portions of the discs are preferably provided with registering windows for the energy storing element or elements of the elastic damper. The outer portions of the discs are preferably adjacent to each other and the discs are arranged to rotate as a unit, for example, by welding or riveting the outer portions of such discs to each other.

In accordance with a modification, the output element of the first slip clutch can comprise a disc-shaped flange having a radially outer portion between the friction surfaces of the input element of the first slip clutch and a radially inner portion which constitutes the input element of the elastic damper. The output element of the elastic damper in such apparatus can include two coaxial discs having radially outer portions which flank the inner portion of the flange, and two radially inner portions which constitute the input element of the second slip clutch. The inner portion of the flange and the outer portions of the discs of the output element of the elastic damper can be provided with registering windows for the energy storing element or elements. The inner portions of the discs of the output element of the elastic damper are preferably adjacent each other and are preferably arranged to rotate as a unit. At least one of the discs is preferably dished, and the inner and outer portions of such one disc can resemble washers which are offset relative to each other in the direction of the common axis of the first and second flywheels. The discs are or can be mirror symmetrical to each other with reference to a plane extending at right angles to the common axis of the first and second flywheels. The discs can be nonrotatably connected to each other by one or more rivets, by spot welding or in any other suitable way.

The output element of the second slip clutch preferably also comprises two friction surfaces which flank the input element of the second slip clutch and are in frictional engagement with such input element. The radially inner portion of the output element of the elastic damper can constitute the input element of the second slip clutch, and such input element is in frictional engagement with the friction surfaces of the output element of the second slip clutch.

The input element of the second slip clutch is preferably rotatable relative to the second flywheel, and the second flywheel preferably comprises means (such as a set of rivets or other suitable protuberances or projections) for limiting the extent of rotary movement of the input element of the second slip clutch relative to the second flywheel. The limiting means can comprise a pair of spaced-apart projections provided on the second flywheel and a further projection (for example a tooth) which is provided on the input element on the second slip clutch between the projections of the pair so that the mutual spacing of projections in the circumferential direction of the second flywheel determines the extent of angular movability of the input element of the second slip clutch relative to the second flywheel and/or vice versa.

The input element of the second slip clutch can comprise a flange or at least one disc which is disposed between and is in frictional engagement with the friction surfaces of the output element of the second slip clutch. The output element of the second slip clutch can comprise two coaxial discs which are provided with the respective friction surfaces. One of the discs is movable axially toward the other disc, and the other disc is preferably provided on the second flywheel. The second slip clutch can further comprise friction linings which are disposed between the respective friction surfaces and the input element of the second slip clutch. The friction linings can be provided on the input element of the second slip clutch. The output element of the second slip clutch can comprise two coaxial discs one of which is movable axially toward the other disc, and such output element preferably further comprises means, particularly one or more rivets, for nonrotatably securing the discs to the second flywheel. The other disc can be fixedly connected to the securing means. For example, the one disc can be provided with at least one opening and the securing means can comprise a fastener (particularly a rivet) which is affixed to the second flywheel and extends through the opening so that the one disc is free to move axially of the second flywheel and relative to the fastener but cannot turn relative to the second flywheel. The input element of the second slip clutch can be provided with at least one recess which receives the securing means with freedom of limited angular movement of the input element of the second slip clutch relative to the second flywheel. Such second slip clutch can further comprise means for biasing the one disc axially toward the other disc. The biasing means can comprise a diaphragm spring which reacts against the second flywheel. To this end, the second flywheel can be provided with a radially extending flange and the diaphragm spring preferably reacts against the flange.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an axial sectional view of a second apparatus;

DESCRIPTION OF THE PREFERRED EMBODIMENTS

Figure 1:
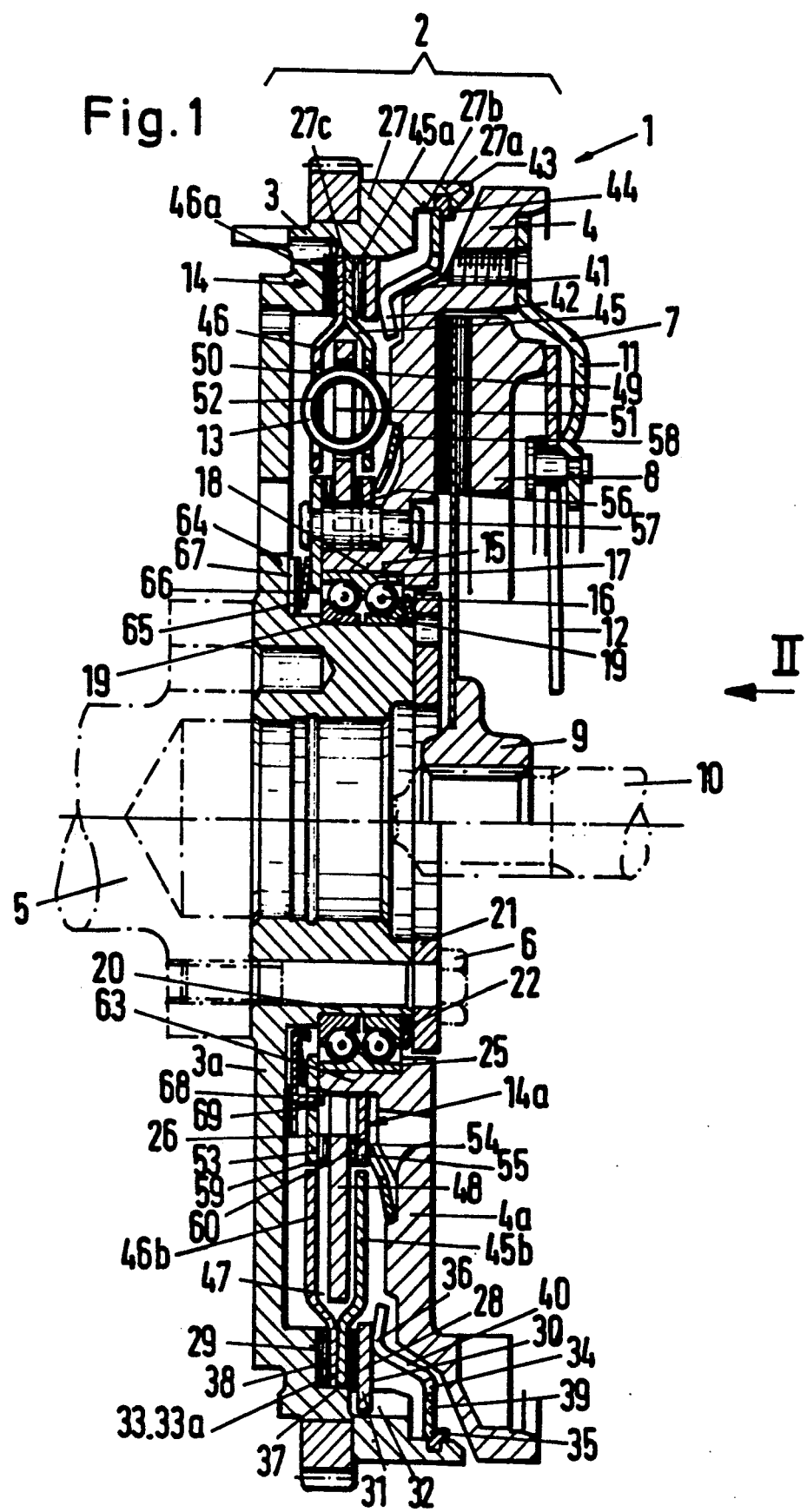
FIG. 1 is an axial sectional view of an apparatus which embodies one form of the invention.
Figure 2:
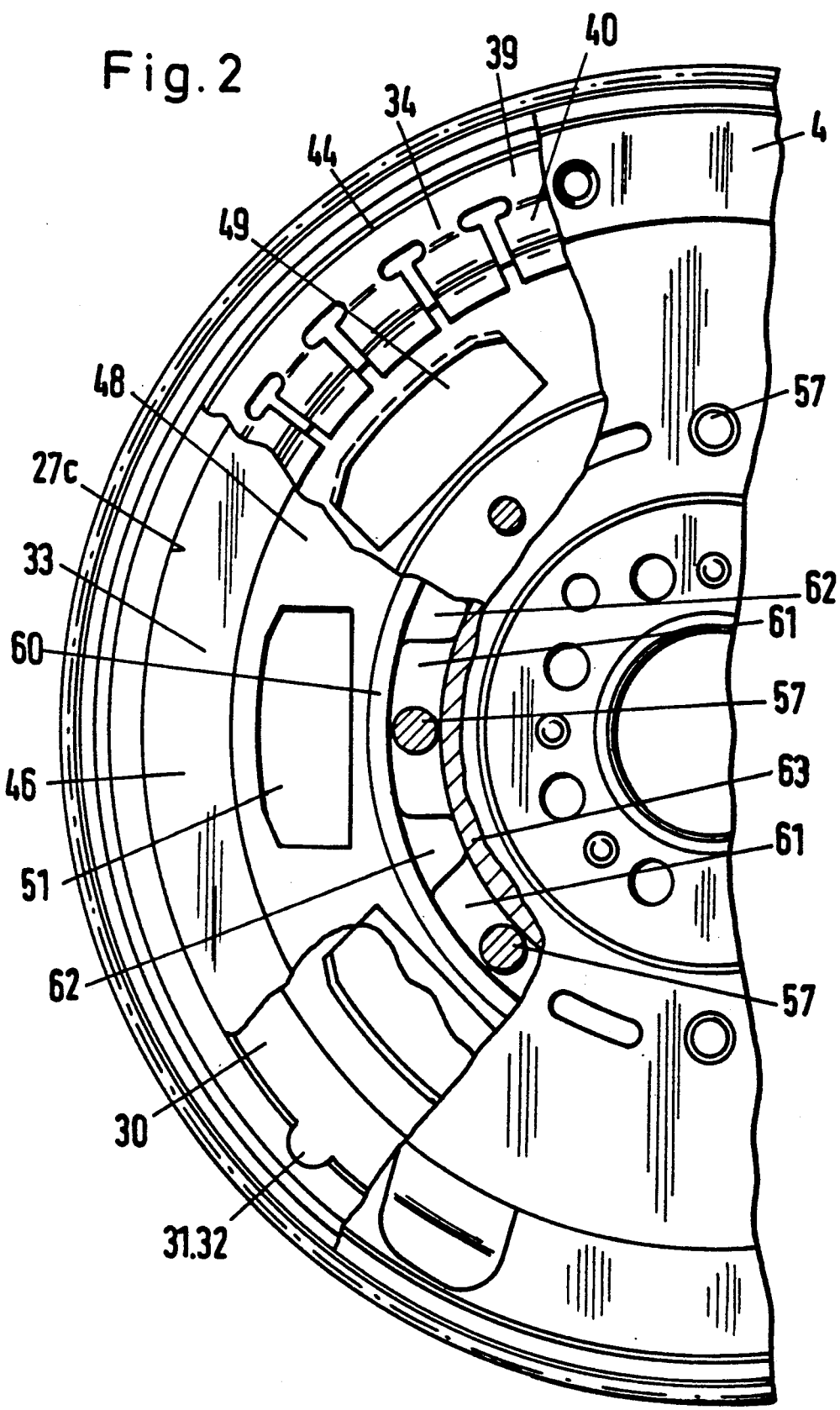
FIG. 2 is a fragmentary elevational view as seen in the direction of arrow II in FIG. 1.

Referring first to FIGS. 1 and 2, there is shown an apparatus 1 which serves to compensate for fluctuations of torque between the engine of a motor vehicle and the change-speed transmission. The engine drives a crankshaft 5 (indicated by phantom lines), and the change-speed transmission comprises an input shaft 10 (also shown by phantom lines). The apparatus 1 comprises a composite flywheel 2 which includes two coaxial flywheels 3 and 4. The flywheel 3 is rigidly connected to the crankshaft 5 by a set of bolts 6 or other suitable fasteners, and the flywheel 4 can drive the input shaft 10 in response to engagement of a friction clutch 7. The friction clutch 7 comprises a cover 11 which is bolted to the flywheel 4, a pressure plate 8 which is axially movably but non-rotatably connected to the flywheel 4 and cover 11, a clutch plate 9 which is nonrotatably secured to the input shaft 10 and is disposed between the flywheel 4 and the pressure plate 8, and a diaphragm spring 12 which is tiltably mounted at the inner side of the cover 11 and normally biases the pressure plate 8 against the clutch plate 9 so that the clutch plate 9 is held in frictional engagement with the adjacent surface of the flywheel 4. The means for disengaging the clutch 7 comprises a bearing (not specifically shown) which can be moved axially of the apparatus 1 to engage the radially inwardly extending prongs of the diaphragm spring 12 in a manner well known from the field of friction clutches for motor vehicles and the like.

In accordance with a feature of the present invention, the apparatus 1 further comprises a plurality of dampers which serve to transmit torque between the flywheels 3 and 4. The dampers include an elastic damper 13 which is disposed at a first radial distance from the common axis of the flywheels 3, 4, crankshaft 5 and input shaft 10; a first slip clutch 14 which is disposed radially outwardly of the damper 13; and a second slip clutch 14a which is disposed radially inwardly of the elastic damper 13. The slip clutches 14, 14a and the elastic damper 13 operate in series in such a way that the input element of the slip clutch 14 is driven by the flywheel 3, that the output element of the slip clutch 14 drives the input element of the elastic damper 13, that the output element of the elastic damper 13 drives the input element of the slip clutch 14a, and that the output element of the slip clutch 14a drives the flywheel 4. The construction of the slip clutches 14, 14a is such that they permit the flywheels 3, 4 to turn relative to each other about their common axis when the slip torque of the respective slip clutch is exceeded. The first slip clutch 14 permits unlimited angular movements of the flywheels 3 and 4 relative to each other. On the other hand, the second slip clutch 14a is designed to permit limited angular movements of the flywheels 3 and 4 relative to each other.

The apparatus 1 further comprises bearing means 15 disposed between the flywheels 3 and 4 and including an antifriction bearing 16 with a one-piece outer race 17, a two-piece inner race 19 and two rows of spherical rolling elements between the two races. The outer race 17 is received in an axial recess 18 of the flywheel 4, and the inner race 17 surrounds and is mounted on a cylindrical protuberance 20 of the flywheel 3. The protuberance 20 extends into the recess 18 of the flywheel 4.

The inner race 19 of the bearing 16 is held against axial movement relative to the protuberance 20 of the flywheel 3 by a disc-shaped retainer 21 which is secured to the flywheel 3 by the bolts 6, and by a diaphragm spring 22 which reacts against the retainer 21 and urges the right-hand half of the inner race 19 axially toward the other half of the inner race whereby the other half of the race 19 abuts an external shoulder of the protuberance 20. The retainer 21 abuts the front end face of the protuberance 20. The purpose of the diaphragm spring 22 is to ensure that the spherical rolling elements of the bearing 16 cannot wobble between the inner and outer races 19 and 17. The outer race 17 of the bearing 16 is held in a preselected axial position by abutting against an internal shoulder 25 of the flywheel 4 and against a disc 26 which is rigidly connected to the flywheel 4.

The radially outermost portion of the flywheel 3 constitutes an axially projecting extension or sleeve 27 which directly surrounds the slip clutch 14. This slip clutch is preferably disposed in a plane (making a right angle with the common axis of the flywheels 3 and 4) which includes the elastic damper 13 and the second slip clutch 14a. In other words, the extension 27 of the flywheel 3 surrounds the elastic damper 13 and the second slip clutch 14a. The provision of two series-connected slip clutches renders it possible to build up the maximum slip torque in stepwise fashion.

The slip clutch 14 has two confronting annular friction surfaces 28, 29 which share all angular movements of the flywheel 3. The friction surfaces 28 and 29 are spaced apart from each other in the direction of the common axis of the flywheels 3 and 4 and serve to transmit to the slip clutch 14 that moment which is generated by the internal combustion engine and is transmitted to the flywheel 3 through the medium of the crankshaft 5. In the embodiment of FIGS. 1 and 2, the friction surface 29 is provided directly on the adjacent portion of the flywheel 3, and the friction surface 28 is provided on a disc 30 which is non-rotatably but axially movably coupled to the flywheel 3. The means for axially movably but non-rotatably coupling the disc 30 to the flywheel 3 comprises radial projections or teeth 31 which are provided at the periphery of the disc 30, and complementary teeth defining tooth spaces 32 along the internal surface of the extension 27.

The output element 33 of the slip clutch 14 comprises a radially outer portion 33a which is received between and is in engagement with the friction surfaces 28 and 29, either directly or through the medium of two friction linings 37, 38 which are applied to the respective surfaces of the radially outer portion 33a.

The means for biasing the disc 30 in a direction toward the radially outer portion 33a of the output element 33 of the slip clutch 14 comprises a diaphragm spring 34 which reacts against the flywheel 3 and urges the friction lining 37 toward the friction lining 38 so that the latter is in proper engagement with the friction surface 29 of the flywheel 3. The radially outermost portion 35 of the annular outer portion 39 of the diaphragm spring 34 reacts against a split ring 44 which is anchored in the internal surface of the extension 27. The radially inner portion 36 of the diaphragm spring 34 bears against the adjacent side of the ring 30 opposite the friction lining 37. In the embodiment of FIGS. 1 and 2, the friction linings 37 and 38 are bonded to the respective sides of the outer portion 33a of the output element 33 of the slip clutch 14. These friction linings need not necessarily be bonded to the outer portion 33a of the output element 33 if each such friction lining constitutes a circumferentially complete washer. Circumferentially complete washers can be loosely inserted between the friction surface 29 and the outer portion 33a on the one hand, and between the outer portion 33a and the disc 30 on the other hand. It is further within the purview of the invention to bond the linings 37 and 38 to the respective friction surfaces 28, 29 so that the linings are then in frictional engagement with the respective sides of the outer portion 33a of the output element 33 of the slip clutch 14.

The inner portion 36 of the diaphragm spring 34 comprises prongs 40 which extend from the annular portion 39 radially inwardly and axially toward the disc 30. Each prong 40 comprises a first portion 41 which is immediately adjacent and integral with the annular portion 39, and a second portion or tip 42 which is inclined with reference to the portion 41 and extends or can extend inwardly beyond the disc 30. The portions 41 are strongly inclined in the axial direction of the composite flywheel 2, namely toward the respective side of the disc 30. It will be seen that the tips 42 of the prongs 40 are axially offset relative to the annular portion 39 of the diaphragm spring 34.

The free end portion 27a of the extension 27 of the flywheel 3 has an internal surface 27b which is provided with a circumferentially complete groove 43 for a portion of the split ring 44. As mentioned above, the radially outermost portion 35 of the annular portion 39 of the diaphragm spring 34 reacts against the split ring 44. It is preferred to provide the split ring 44 with an internal shoulder for the radially outermost portion 35 of the annular portion 39. The diaphragm spring 34 is installed in prestressed condition so that its prongs 40 invariably bear against the disc 30 in order to urge the friction lining 37 against the outer portion 33a of the output element 33 of the slip clutch 14 and to urge the outer portion 33a against the friction lining 38 which is thereby maintained in adequate engagement with the friction surface 29 of the flywheel 3. The outermost portion 35 of the annular portion 39 of the diaphragm spring 34 holds the split ring 44 in the groove 43 of the internal surface 27b.

The output element 33 of the first slip clutch 14 comprises two mirror symmetrical discs 45, 46 which are preferably made of sheet metal by stamping or a similar procedure and are non-rotatably connected to each other. For example, the radially outer portions 45a, 46a of the discs 45, 46 can be spot welded, riveted or otherwise non-rotatably connected to each other so that they are in actual abutment, at least in the region where they extend between the friction surfaces 28 and 29. The radially inner portions 45b, 46b of the discs 45, 46 define an annular space 47 which receives, with a certain amount of axial clearance, a flange 48 which constitutes the output element of the elastic damper 13. The inner portions 45b, 46b of the discs 45, 46 together constitute the input element of the damper 13. Each of the discs 45, 46 is a dished body having two axially offset washer-like portions (45a, 45b and 46a, 46b) which are integrally connected to each other in the region immediately adjacent the internal surfaces of the friction linings 37 and 38.

The elastic damper 13 further comprises a set of circumferentially extending energy storing elements in the form of coil springs 52 each of which is received in a window 50 of the inner portion 45b of the disc 45, in a registering window 51 of the flange 48, and in a registering window 50 of the inner portion 46b of the disc 46. The coil springs 52 permit a certain amount of angular movement of the discs 45, 46 relative to the flange 48 and vice versa. The discs 45, 46 are centered between the flywheels 3 and 4 in that the peripheries of their outer portions 45a, 46a abut the portion 27c of the internal surface 27b of the extension 27 of the flywheel 3.

The second slip clutch 14a comprises an output element with two confronting annular friction surfaces 53, 54 which are rotatable with the flywheel 4. As mentioned above, the slip clutch 14a is interposed between the elastic damper 13 and the flywheel 4. The friction surfaces 53, 54 are spaced apart from each other in the axial direction of the flywheels 3, 4 and are designed to transmit at least a portion of torque which is generated by the internal combustion engine and is transmitted by the crankshaft 5, flywheel 3, slip clutch 14 and elastic damper 13. The output element of the slip clutch 14a includes the aforementioned disc 26 on which the friction surface 53 is formed and a disc or ring 55 which is provided with the friction surface 54. The radially inner portion of the disc 55 has openings in the form of recesses 56 for rivets 57 or similar projections which are secured to the flywheel 4 and serve to non-rotatably connect the latter with the disc 55. To this end, the openings 56 of the disc 55 receive the corresponding portions of the rivets 57 in such a way that the disc 55 can move axially toward or away from the flywheel 4 but cannot rotate relative thereto. In other words, the disc 55 is movable axially of the flywheel 4 so as to shift its friction surface 54 toward or away from the friction surface 53 on the disc 26. The rivets 57 further serve to fix the disc 26 to the flywheel 4. At the very least, the rivets 57 ensure that the disc 26 cannot rotate relative to the flywheel 4.

The radially inner portion of the flange 48 constitutes the input element of the slip clutch 14a and, to this end, is in frictional engagement with the adjacent surfaces 53, 54. In other words, the input element 48 of the slip clutch 14a is integral or rigid with the output element of the elastic damper 13.

The slip clutch 14a further comprises means for biasing the disc 55 axially toward the disc 26 so as to ensure that the input element 48 is properly clamped between the discs 26 and 55. The biasing means comprises a diaphragm spring 58 which has a radially outer portion bearing against a radially extending flange 4a of the flywheel 4 and a radially inner portion bearing against the adjacent portion of the disc 55 so that the disc 55 is urged axially toward the disc 26.

Friction linings 59, 60 of the slip clutch 14a are disposed at opposite sides of the radially inner portion of the flange 48 so as to be in contact with the respective friction surfaces 53 and 54. The friction linings 59, 60 are bonded to the flange 48. However, if the linings 59, 60 are circumferentially complete washers, they can be loosely inserted between the discs 26, 55 and the respective sides of the inner portion of the flange 48. Still further, it is possible to bond the linings 59, 60 to the respective friction surfaces 53, 54 so that the linings are then in frictional engagement with the respective sides of the flange 48.

FIG. 2 shows that the flange 48 has an internal surface provided with recesses 61 alternating with projections in the form of radially inwardly extending teeth 62 which, in turn, alternate with the rivets 57. The length of the recesses 61 in the circumferential direction of the flywheels 3, 4 determines the extent to which the flange 48 (i.e., the input element of the slip clutch 14a) is turnable relative to the flywheel 4 and vice versa. The slip clutch 14a surrounds a sleeve-like axial protuberance or extension 63 of the flywheel 4. This ensures accurate centering of the slip clutch 14a relative to the flywheels 3 and 4. The protuberance 63 of the flywheel 4 faces toward the protuberance 20 of the fywheel 3, and the bearing means 15 is disposed between the two protuberances.

FIG. 1 shows that the friction surface 29 of the slip clutch 14 is substantially coplanar with the friction surface 53 of the slip clutch 14a,, and that the friction surface 28 of the slip clutch 14 is substantially coplanar with the friction surface 54 of the slip clutch 14a.

The diaphragm springs 34 and 58 are dimensioned and mounted in such a way that the axial bias of the diaphragm spring 34 exceeds the axial bias of the diaphragm spring 58. The space between the flywheels 3 and 4 further accommodates a friction generating device 64 which operates in parallel with the energy storing coil springs 52 of the elastic damper 13. The friction generating device 64 surrounds the protuberance 20 of the flywheel 3 and is disposed between the disc 26 and the radially extending portion 3a of the flywheel 3. It comprises a diaphragm spring 65 which reacts against the disc 26 and bears against a ring 66 so that the latter exerts axial pressure upon a friction ring 67 which is thereby held in frictional engagement with the portion 3a of the flywheel 3. The radially outer portion of the ring 66 has axially extending projections or arms 68 which extend axially through corresponding cutouts or recesses 69 of the disc 26 so that the ring 66 and the disc 26 are held against rotation relative to each other.

The extent to which the input element 33 and the output element 48 of the elastic damper 13 can rotate relative to each other about the common axis of the flywheels 3 and 4 is determined by maximum compressibility of the coil springs 52. The elements 33 and 48 can no longer rotate relative to each other when the coil springs 52 are compressed to such an extent that their convolutions abut each other. At such time, the coil springs 52 constitute rigid bodies, as considered in the circumferential direction of the flywheels 3 and 4.

Figure 3A:
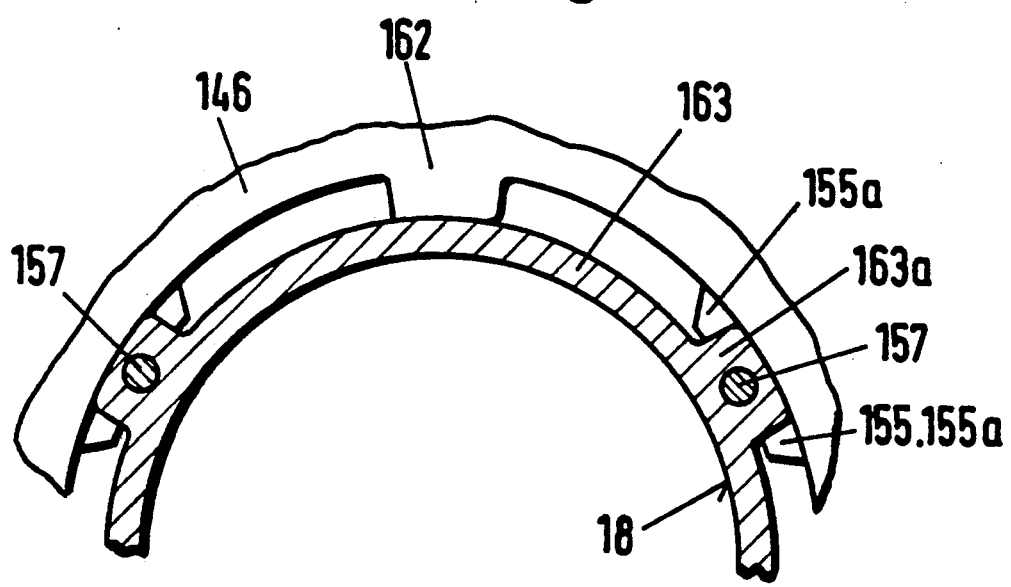
FIG. 3a is a fragmentary transverse sectional view of the second apparatus.

FIGS. 3 and 3a illustrate a modified apparatus 1 wherein all such parts which are identical with or clearly analogous to the corresponding parts of the apparatus of FIGS. 1-2 are denoted by the same reference characters. In this apparatus, the output element of the first or outer slip clutch 14 is a flange-like or disc-like member 133 (hereinafter called flange) the radially outer portion 133a of which extends into the space between the friction linings 37, 38, i.e., into the space between the friction surfaces 28 and 29. The friction linings 37 and 38 can be bonded to the respective sides of the outer portion 133a of the output element 133.

The radially inner portion 133b of the flange 133 constitutes the input element of the elastic damper 13 and extends into the space between the radially outer portions 145b, 146b of two dished discs 145, 146. The radially inner portions 145a, 146a of the discs 145, 146 are preferably welded, riveted or otherwise rigidly and non-rotatably connected to each other and constitute the input element of the second slip clutch 14b. The space between the outer portions 145b, 146b for the inner portion 133b of the flange 133 is denoted by the reference character 147. Each of the discs 145, 146 includes two axially spaced-apart washer-like portions (145a, 145b and 146a, 146b) which are integral with each other in the region immediately surrounding the discs 126, 155 of the inner or second slip clutch 14b. The outer portion 145b is formed with one or more windows 149 which register with windows 151 of the flange 133 and with windows 150 of the outer portion 146b to receive energy storing elements in the form of coil springs 52. Such coil springs form part of the elastic damper 13 and operate between the portions 145b, 146b on the one hand and the portion 133b on the other hand.

The slip clutch 14a comprises two friction surfaces 153, 154 which form part of its output element and are held against rotation relative to the flywheel 4. The friction surface 153 is provided on the disc 126, and the disc 126 is secured to the protuberance 163 of the flywheel 4 by rivets or similar fasteners 157. The friction surface 154 is provided on the disc 155 which is held against rotation relative to the flywheel 4 but is movable axially of the protuberance 163. The inner portions 145a, 146a of the discs 145, 146 extend into the space between the friction surfaces 153, 154. The diaphragm spring 58 operates in a manner similar to that of the diaphragm spring 58 in the apparatus 1 of FIGS. 1 and 2. In other words, the spring 58 biases the disc 155 axially toward the inner portions 145a, 146a and the disc 126. Friction linings 59, 60 are interposed between the friction surfaces 53, 54 and the respective sides of the input element including the outer portions 145a, 146a of the discs 145, 146.

FIG. 3a shows that the sleeve-like axial protuberance 163 of the flywheel has radially outwardly extending tooth-like projections 163a which determine the extent to which the discs 145, 146 and the flywheel 4 can turn relative to each other. The discs 145, 146 have radially inwardly extending projections or teeth 162 which alternate with projections 163a on the protuberance 163. The mutual spacing of projections 163a and the dimensions of projections 162 determine the extent of maximum angular displacement of the flywheel 4 and the discs 145, 146 relative to each other. In other words, the projections 162, 163a determine the range of operation of the second slip clutch 14a. The disc 155 has radially inwardly extending arms 155a which flank the adjacent projections 163a so as to ensure that the flywheel 4 and the disc 155 cannot rotate relative to each other.

The mode of operation of the apparatus which are shown in FIGS. 1-2 and 3-3a will be described with reference to the diagram of FIG. 4 wherein the angular displacement of the flywheels 3 and 4 relative to each other (in degrees) is measured along the abscissa, and the magnitude of torque (M) which is transmitted by the damper means including the elastic damper 13 and the slip clutches 14, 14a is measured along the ordinate. It is to be borne in mind that the magnitude of torque which is transmitted by the slip clutch 14 is dependent on the magnitude of centrifugal force acting upon the prongs 40 of the diaphragm spring 34. This is due to the fact that the prongs 40 tend to move radially outwardly when the rotational speed of the flywheel 3 increases so that they exert a greater force upon the disc 30 of the slip clutch 14.

It is assumed that the projections or teeth 62 abut the adjacent projections 57 or that the projections 162 abut the respective projections 163a so that the input and output elements of the respective slip clutch 14a are free to perform maximal angular displacements relative to each other.

The idle or starting positions of the flywheels 3, 4 relative to each other are denoted by the character 71. If one of the flywheels 3, 4 turns relative to the other flywheel and/or vice versa, at least one coil spring 52 of the elastic damper 13 is caused to store additional energy until the moment which is generated by the springs 52 overcomes the slip torque of the clutch 14a. Such situation develops when the flywheel 3 covers an angular distance 72 relative to the flywheel 4 and/or vice versa. It is assumed that the flywheel 3 turns relative to the flywheel 4. If the flywheel 3 continues to turn beyond the angle 72, the input and output elements of the slip clutch 14a turn relative to each other until the projections 62 reach the respective rivets 57 or the projections 162 come into actual abutment with the corresponding 1 projections 163a. The extent of angular displacement of the input and output elements of the slip clutch 14a is denoted in FIG. 4 by the character 73. Such displacement is selected in advance and can vary within a wide range, for example, between 10° and 120° It is also possible to reduce the angle to less than 10° or to increase the angle beyond 120° but an angle between 10° and 120° has been found to be quite satisfactory for a number of purposes.

If the flywheel 3 continues to turn in the same direction beyond the combined angle 72+73, the coil springs 52 of the elastic damper 13 undergo further compression due to the higher moment of friction which can be transmitted by the slip clutch 14. Further compression of the coil springs 52 is terminated within the angle 74 so that the coil springs 52 then constitute rigid blocks which prevent any further angular displacements of the input and output elements of the elastic damper 13 relative to each other. As mentioned above, such situation arises when the neighboring convolutions of each coil spring 52 abut each other.

Further angular displacements of the flywheel 3 relative to the flywheel 4 are possible (upon completed compression of the coil springs 52) only if the torque which the engine transmits to the flywheel 3 exceeds the moment which can be transmitted by the slip clutch 14, for example, due to pronounced peaks or surges of angular displacement of the flywheel 3 and crankshaft 5. The magnitude of that moment which can be transmitted by the slip clutch 14 depends upon the RPM of the internal combustion engine and its minimum value is denoted in FIG. 4 by the line 75. The slip torque (75) of the slip clutch 76 then exceeds the torque 76 at which the coil springs 52 of the elastic damper 13 undergo maximum compression.

It is advisable, at least under certain circumstances, to select the moment which can be transmitted by the slip clutch 14 in such a way that this moment (up to a certain RPM of the engine) is smaller than that which is required to entail complete compression of the coil springs 52. When the moment which can be transmitted by the slip clutch 14 is exceeded, the flywheels 3 and 4 can rotate relative to each other without any limitations, i.e., there is no need for the provision of a stop which would positively prevent the flywheels 3 and 4 from turning relative to each other beyond a preselected angle not exceeding 360°. The slip torque of the clutch 14 which is denoted in FIG. 4 by the line 75 corresponds to the minimal moment which can be transmitted by this clutch. In other words, the slip clutch 14 can transmit the moment 75 also when the RPM of the engine which drives the crankshaft 5 and the flywheel 3 is reduced to zero.

Figures 4, 5:
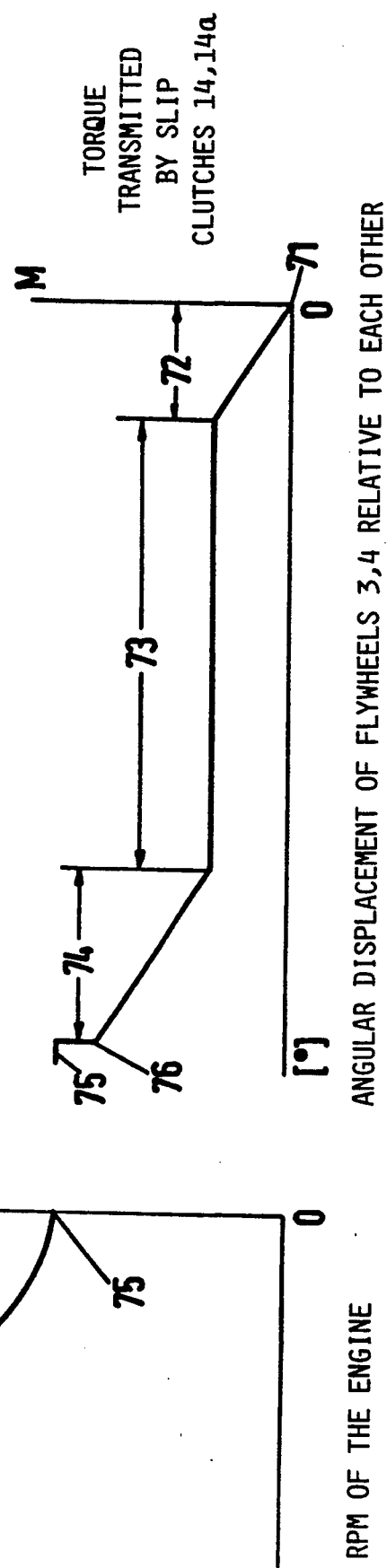
FIG. 4 is a diagram wherein the angular displacement of the flywheels relative to each other is measured along the abscissa and the transmitted torque is measured along the ordinate.
FIG. 5 is a diagram wherein the RPM of the engine which drives the first flywheel is measured along the abscissa and variable torque which is transmitted by one of the slip clutches is measured along the ordinate.

In the diagram of FIG. 5, the RPM of the engine and of the crankshaft 5 are measured along the abscissa, and the torque which is transmitted by the slip clutch 14 is measured along the ordinate. As already mentioned above the slip clutch 14 can transmit a preselected minimum moment or torque (75) even when the engine which drives the crankshaft 5 and the flywheel 3 is idle. This is due to the fact that the diaphragm spring 34 is installed in prestressed condition so that the prestressed spring 34 ensures the transmission of minimal torque between the input and output elements of the slip clutch 14. As also mentioned above, the prongs 40 of the diaphragm spring 34 tend to move radially outwardly relative to the annular portion 39 due to their configuration so that they exert upon the disc 30 or 130 a progressively increasing force (acting in the axial direction of the flywheels 3, 4) as the RPM of the engine increases, i.e., as the magnitude of centrifugal force acting upon the flywheel 3 and upon the prongs 40 increases. Thus, the disc 30 or 130 bears upon the adjacent friction lining 37 with a force which increases as the rotational speed of the flywheel 3 increases. This causes the magnitude of torque which can be transmitted by the slip clutch 14 to vary in accordance with the substantially parabolical curve 77 which is shown in FIG. 5. The configuration of the prongs 40 is preferably such that the torque (77) which is transmitted by the slip clutch 14 invariably exceeds the moment which is transmitted by the internal combustion engine. In other words, torque which can be transmitted by the slip clutch 14 should invariably exceed the torque which is transmitted by the engine within the entire RPM range. This can be seen in the diagram of FIG. 5.

In order to account for manufacturing tolerances, deviations of actual friction from the reference value as well as for wear upon the components of the slip clutch 14, particularly for wear upon the friction lining 37 and 38, it is preferred to design the slip clutch 14 in such a way that, when the internal combustion engine is idle, torque which can be transmitted by the slip clutch 14 exceeds the nominal torque of the engine.

The apparatus which are shown in FIGS. 1-2 and 3-3a are preferably designed in such a way that torque which is transmitted by the slip clutch 14 is the same regardless of whether the vehicle is driven or coasting, i.e., regardless of whether the flywheel 3 drives the flywheel 4 or vice versa.

An important advantage of the improved apparatus is its versatility and adaptability to practically any circumstances of use. The characteristics of the dampers including the elastic damper 13 and the slip clutches 14, 14a can be selected within a wide range so as to furnish an optimum damping action in a variety of vehicles including passenger cars, trucks and others.

The slip clutch 14a is preferably designed in such a way that its input and output elements are not acted upon by energy storing elements during any part of their angular movement relative to each other. However, under certain circumstances, it may be advisable to design the slip clutch 14a in such a way that energy storing elements act upon its components during the initial and/or during the last stage of angular displacement of its input and output elements relative to each other. This renders it possible to avoid abrupt and pronounced impacts between the input and output elements when the extent of angular displacement of such elements relative to each other reaches the one or the other extreme value. The arrangement is preferably such that, if resilient elements do influence the angular movements of the input and output elements of the slip clutch 14a relative to each other (by opposing such angular movements), the range of their action upon the input and output elements of the clutch 14a is preferably narrow. The major part of angular movements of the input and output elements of the slip clutch 14a is preferably not affected by the restoring action of one or more energy storing elements.

It has been found that the characteristics of the slip clutches, particularly of the slip clutch 14a, can be properly selected in dependency on the vibratory behavior of the internal combustion engine and the entire drive system and also in dependency upon damping characteristics of other components of the damper means in such a way that the two slip clutches, in combination with the elastic damper 13, ensure proper suppression of all peaks of fluctuations of torque which is transmitted by the engine in that the damper means absorbs the excess of energy. In many instances, proper conformance of damping characteristics to fluctuations of the torque which is transmitted by the engine can be achieved by selecting the slip torque of the clutches 14 and 14a in such a way that the slip torque of the clutch 14a is less than the slip torque of the clutch 14. The mounting of elastic damper 13 in series with and between the slip clutches 14 and 14a contributes to more satisfactory operation and lower cost of the entire apparatus. The space requirements and the cost of the damper means can be reduced considerably by placing the slip clutch 14 and/or slip clutch 14a into the general plane of the elastic damper 13. It is presently preferred to place the slip clutch 14a radially inwardly of and to place the slip clutch 14 radially outwardly of the elastic damper 13. However, it is also possible, and under certain circumstances advisable, to change the positions of the slip clutches 14, 14a with reference to the elastic damper 13. In other words, it is also possible to place the slip clutch 14a radially outwardly and to place the slip clutch 14 radially inwardly of the damper 13.

It is further within the scope of the invention to construct each of the slip clutches 14, 14a in such a way that the magnitude of torque or moment which the slip clutches can transmit varies in dependency upon changes of rotational speed of the crankshaft 5, preferably in response to changes of the magnitude of centrifugal force acting upon one or more component parts of the respective slip clutch. The arrangement is preferably such that the magnitude of torque which the respective slip clutch can transmit increases in response to increasing centrifugal force (note the diaphragm spring 34). In accordance with a presently preferred embodiment of the invention, and as shown in FIGS. 1-3a, the magnitude of torque which the slip clutch 14a can transmit is constant or nearly constant and the magnitude of slip torque which can be transmitted by the clutch 14 is variable in response to variations of RPM of the engine. As mentioned above, and as shown at 75 in FIGS. 4 and 5, one of the slip clutches (preferably the slip clutch 14) is designed in such a way that it transmits a minimum torque regardless of the RPM of the engine. As the RPM increases, the magnitude of torque which is transmitted by the slip clutch 14 increases in accordance with the curve 77 of FIG. 5.

The provision of discrete biasing means (such as the aforediscussed diaphragm springs) for each of the slip clutches is desirable and advantageous because this renders it possible to properly select and adjust the respective slip torque. Each of the clutches 14, 14a can comprise one, two or more biasing means in the form of diaphragm springs or the like. The diaphragm springs are preferably installed in prestressed condition.

A further important advantage of the improved apparatus is that the component parts of the slip clutches 14, 14a and of the elastic damper 13 can be properly and simply centered relative to the common axis of the flywheels 3 and 4. This is attributable to the aforediscussed design and mounting of the elements of the three main constituents of the damper means. The parts of the slip clutch 14a are preferably centered on the flywheel 4, the parts of the slip clutch 14 are preferably centered on or in the flywheel 3, and the parts of the elastic damper 13 are or can be centered on the flywheel 3 and/or 4. The bearing means 15 ensures accurate centering of the flywheel 3 relative to the flywheel 4 and a predictable and accurate centering of the damper 13 and slip clutches 14, 14a relative to the two flywheels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, said first and second slip clutches respectively having means for transmitting different first and second slip torques between said first and second flywheels and one of said slip clutches being arranged to permit unlimited angular movements of said first and second flywheels relative to each other, the other of said slip clutches having input and output elements which are angularly movable relative to each other and at least the major part of angular movability of said input and output elements relative to each other being unaffected by restoring action of circumferentially acting energy storing means.

2. The apparatus of claim 1, wherein said first slip clutch includes means for opposing rotation of said first and second flywheels relative to each other through a predetermined angle.

3. The apparatus of claim 2, wherein said second slip clutch includes means for opposing all angular movements of said first and second flywheels relative to each other.

4. The apparatus of claim 2, wherein the slip torque of said second slip clutch exceeds the slip torque of said first slip clutch.

5. The apparatus of claim 1, wherein said elastic damper is disposed in a predetermined plane extending at right angles to the common axis of said flywheels, at least one of said slip clutches being disposed in or close to said plane.

6. The apparatus of claim 1, wherein said first slip clutch is disposed at a first radial distance from the common axis of said flywheels, said elastic damper is disposed at a greater second distance from said axis and said second slip clutch is disposed at a still greater third distance from said axis.

7. The apparatus of claim 6, wherein one of said slip clutches includes means for opposing all angular movements of said first and second flywheels relative to each other.

8. The apparatus of claim 6, wherein one of said slip clutches includes means for opposing rotation of said first and second flywheels relative to each other within a predetermined angle.

9. The apparatus of claim 1, wherein one of said slip clutches includes means for opposing rotation of said first and second flywheels relative to each other with a variable force.

10. The apparatus of claim 1, wherein at least one of said slip clutches includes means for opposing rotation of said first and second flywheels relative to each other with a substantially constant force.

11. The apparatus of claim 1, wherein said first slip clutch includes means for opposing rotation of said first and second flywheels relative to each other within a predetermined angle and with a substantially constant force, said second slip clutch including means for opposing all angular movements of said first and second flywheels relative to each other with a variable force.

12. The apparatus of claim 1, wherein said first torque is smaller than said second torque and said first slip clutch is arranged to oppose angular movements of said first and second flywheels relative to each other within a predetermined angle.

13. The apparatus of claim 1, wherein said first slip clutch includes means for opposing angular movements of said first and second flywheels relative to each other with a force whose magnitude exceeds a preselected minimum value.

14. The apparatus of claim 1, wherein each of said slip clutches includes at least one energy storing element.

15. The apparatus of claim 1, wherein one of said flywheels has an axial protuberance and one of said slip clutches surrounds said protuberance.

16. The apparatus of claim 1, wherein one of said slip clutches is mounted on said second flywheel, and further comprising a friction clutch interposed between said second flywheel and the input member of the change-speed transmission.

17. The apparatus of claim 1, wherein said first slip clutch is operative to oppose all angular movements of said first and second flywheels relative to each other and includes an input element having a disc-shaped component, means for axially movably but non-rotatably coupling said component to said first flywheel, confronting first and second friction surfaces respectively provided on said first flywheel and on said component, and an output element disposed between and in engagement with said friction surfaces.

18. The apparatus of claim 17, wherein said first slip clutch further comprises a diaphragm spring which is arranged to bias said disc-shaped component axially toward the output element of said first slip clutch and to thereby bias the output element of said first slip clutch axially against said first friction surface.

19. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches being operative to oppose all angular movements of said first and second flywheels relative to each other and including an input element having two confronting friction surfaces arranged to rotate with one of said flywheels and an output element disposed between and in frictional engagement with said surfaces, said elastic damper having an input element receiving torque from said output element, an output element arranged to transmit torque to the other of said slip clutches, and at least one energy storing resilient element between the input and output elements of said elastic damper, said first slip clutch being arranged to permit unlimited angular movements of said first and second flywheels relative to each other and said second slip clutch having portions which are angularly movable relative to each other, at least the major part of angular movability of said portions of said second slip clutch relative to each other being unaffected by restoring action of circumferentially acting energy storing means.

20. The apparatus of claim 19, wherein the input element of said elastic damper is rigid with the output element of said one slip clutch.

21. The apparatus of claim 20, wherein said other slip clutch has an input element which is rigid with the output element of said elastic damper and an output element which is arranged to rotate with the other of said first and second flywheels.

22. The apparatus of claim 21, wherein the output element of said one slip clutch comprises two friction linings which engage said friction surfaces.

23. The apparatus of claim 21, wherein the output element of said one slip clutch comprises two coaxial discs having radially outer portions disposed between said friction surfaces and axially spaced-apart radially inner portions constituting the input element of said elastic damper and flanking the output element of said elastic damper.

24. The apparatus of claim 23, wherein the output element of said elastic damper and the radially inner portions of said discs have registering windows for said energy storing element.

25. The apparatus of claim 23, wherein the radially outer portions of said discs are adjacent each other and said discs are arranged to rotate as a unit.

26. The apparatus of claim 21, wherein the output element of said one slip clutch comprises a disc-shaped flange having a radially outer portion between said friction surfaces and a radially inner portion constituting the input element of said elastic damper, the output element of said elastic damper including two coaxial discs having radially outer portions flanking the radially inner portion of said flange and radially inner portions constituting the input element of said other slip clutch.

27. The apparatus of claim 26, wherein the radially inner portion of said flange and the radially outer portions of the discs of the output element of said elastic damper have registering windows for said energy storing element.

28. The apparatus of claim 26, wherein the radially inner portions of the discs of the output element of said elastic damper are adjacent each other and are arranged to rotate as a unit.

29. The apparatus of claim 26, wherein at least one of said discs is dished and said inner and outer portions of said one disc resemble washers which are offset relative to each other in the direction of the common axis of said first and second flywheels.

30. The apparatus of claim 26, wherein said discs are mirror symmetrical to each other with reference to a plane extending at right angles to the common axis of said flywheels.

31. The apparatus of claim 26, further comprising means, particularly one or more rivets, for non-rotatably connecting said discs to each other.

32. The apparatus of claim 21, wherein the output element of said other slip clutch has two friction surfaces flanking the output element of said other slip clutch and being in frictional engagement therewith.

33. The apparatus of claim 32, wherein the output element of said elastic damper comprises a radially inner portion which constitutes the input element of said other slip clutch.

34. The apparatus of claim 21, wherein the input element of said other slip clutch is rotatable relative to said other flywheel and said other flywheel comprises means for limiting the extent of rotary movement of the input element of said other slip clutch relative to said other flywheel.

35. The apparatus of claim 34, wherein said limiting means comprises a pair of spaced-apart projections provided on said other flywheel and a further projection provided on the input element of said other slip clutch between the projections of said pair of projections.

36. The apparatus of claim 21, wherein the output element of said other slip clutch comprises two confronting friction surfaces arranged to rotate with said other flywheel and the input element of said other slip clutch comprises at least one disc which is disposed between and is in frictional engagement with said surfaces.

37. The apparatus of claim 36, wherein the output element of said other slip clutch comprises two coaxial discs which are provided with said friction surfaces, one of said discs being movable axially toward the other of said discs and said other disc being provided on said other flywheel.

38. The apparatus of claim 36, wherein said other clip clutch further comprises friction linings between said friction surfaces and the input element of said other slip clutch.

39. The apparatus of claim 38, wherein said friction linings are provided on the input element of said other slip clutch.

40. The apparatus of claim 36, wherein the output element of said other slip clutch comprises two coaxial discs one of which is movable axially toward the other of said discs and means, particularly one or more rivets, for non-rotatably securing said discs to said other flywheel.

41. The apparatus of claim 40, wherein said other disc is fixedly connected to said securing means.

42. The apparatus of claim 40, wherein said one disc has at least one opening and said securing means comprises a fastener which is affixed to said other flywheel and extends through said opening so that said one disc is movable axially of said other flywheel and relative to said fastener.

43. The apparatus of claim 40, wherein the input element of said other slip clutch has at least one recess receiving said securing means with freedom of limited angular movement of the input element of said other slip clutch relative to said other flywheel.

44. The apparatus of claim 40, wherein said other slip clutch further comprises means for biasing said one disc axially toward the other disc.

45. The apparatus of claim 44, wherein said biasing means comprises a diaphragm spring which reacts against said other flywheel.

46. The apparatus of claim 45, wherein said other flywheel has a radially extending flange and said diaphragm spring reacts against said flange.

47. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches including means for opposing rotation of said first and second flywheels relative to each other with a variable force and said input member being arranged to drive said first flywheel at a variable speed, said rotation opposing means being responsive to variations of speed of said first flywheel.

48. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other and said input member being arranged to drive said first flywheel at a variable speed; and a plurality of dampers disposed in series and operative to oppose rotation of said first and second flywheels relative to each other, said dampers including first and second slip clutches and an elastic damper, one of said slip clutches including means for transmitting between said first and second flywheels a torque whose magnitude increases with increasing speed of said first flywheel.

49. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other and each thereof being rotatable at a plurality of speeds; and a plurality of dampers disposed in series and operative to oppose rotation of said first and second flywheels relative to each other, said dampers including first and second slip clutches and an elastic damper, at least one of said slip clutches including a prestressed diaphragm spring which is acted upon by centrifugal force when said flywheels rotate and whose bias varies in response to variations of centrifugal force acting upon said spring.

50. The apparatus of claim 49, wherein said diaphragm spring includes an axially stressed annular portion and at least one axially stressed second portion which is axially offset relative to said annular portion and whose bias increases in response to increasing centrifugal force.

51. The apparatus of claim 50, wherein said one slip clutch further comprises an axially movable friction generating element which is biased by said second portion.

52. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper and said slip clutches being acted upon by centrifugal force when said flywheels rotate, said elastic damper being disposed at a predetermined radial distance from the common axis of said flywheels and one of said slip clutches being nearer to said axis than said elastic damper and including means for generating a substantially constant slip torque, the other of said slip clutches being more distant from said axis than said elastic damper and including means for transmitting a slip torque which varies as a function of changes of centrifugal force acting upon said other slip clutch.

53. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches being operative to oppose all angular movements of said first and second flywheels relative to each other and including an input element having a disc-shaped component, means for axially movably but non-rotatably coupling said component to said first flywheel, confronting first and second friction surfaces respectively provided on said first flywheel and on said component, an output element disposed between and in engagement with said friction surfaces, and a diaphragm spring arranged to bias said disc-shaped component axially toward said output element and to thereby bias said output element axially against said first friction surface, said diaphragm spring having an annular portion which reacts against said first flywheel and at least one prong which bears against said disc-shaped component.

54. The apparatus of claim 53, wherein said prong extends from said annular portion toward the common axis of said flywheels.

* * * * *